(12) United States Patent
Millen et al.

(10) Patent No.: US 12,346,822 B2
(45) Date of Patent: Jul. 1, 2025

(54) SYSTEMS AND METHODS FOR GENERATING MODELS TO IDENTIFY STATES AND ACTIONS

(71) Applicant: Regie.ai, Inc., San Francisco, CA (US)

(72) Inventors: Matthew Millen, Yarrow Point, WA (US); Srinath Sridhar, San Francisco, CA (US); Thomas Tobin, Tiburon, CA (US)

(73) Assignee: Regie.ai, Inc., San Francisco, CA (US)

( * ) Notice: Subject to any disclaimer, the term of this patent is extended or adjusted under 35 U.S.C. 154(b) by 0 days.

(21) Appl. No.: 18/493,484

(22) Filed: Oct. 24, 2023

(65) Prior Publication Data
US 2025/0131278 A1    Apr. 24, 2025

(51) Int. Cl.
*G06N 3/092* (2023.01)
*G06N 3/045* (2023.01)

(52) U.S. Cl.
CPC ............. *G06N 3/092* (2023.01); *G06N 3/045* (2023.01)

(58) Field of Classification Search
CPC .......... G06N 3/092; G06N 3/045; G06N 3/08; G06N 3/0455; G06N 3/04; G06N 3/047
See application file for complete search history.

(56) References Cited

U.S. PATENT DOCUMENTS

| | | | | |
|---|---|---|---|---|
| 9,892,414 | B1 * | 2/2018 | Henry | G06N 3/08 |
| 2020/0320435 | A1 * | 10/2020 | Sequeira | G06N 5/04 |
| 2021/0256389 | A1 * | 8/2021 | Gross | G06N 3/063 |
| 2022/0270594 | A1 * | 8/2022 | Sejpal | G06N 3/045 |
| 2022/0292266 | A1 * | 9/2022 | Dey | G06N 3/0455 |
| 2023/0199026 | A1 * | 6/2023 | Venzin | H04L 63/1441 726/22 |
| 2023/0237277 | A1 * | 7/2023 | Reza | G06F 40/169 704/9 |
| 2023/0368037 | A1 * | 11/2023 | Huang | G06N 3/045 |
| 2023/0418815 | A1 * | 12/2023 | Zorn | G06F 8/427 |
| 2024/0119299 | A1 * | 4/2024 | Park | G06N 3/092 |

(Continued)

OTHER PUBLICATIONS

Verma et al., "CHAI: A CHatbot AI for Task-Oriented Dialogue with Offline Reinforcement Learning," arXiv:2204.08426v1 [cs.CL] Apr. 18, 2022 (Year: 2022).*

(Continued)

*Primary Examiner* — Miranda M Huang
*Assistant Examiner* — Yao David Huang
(74) *Attorney, Agent, or Firm* — COOLEY LLP

(57) ABSTRACT

A method includes defining, using a first neural network, and based on a plurality of inputs, a first state associated with (1) an entity and (2) a first node from a plurality of nodes included in a reinforcement learning model. The reinforcement learning model determines, based on a reward, (1) a second state associated with a second node and (2) an indication of an action associated with a transition from the first state to the second state. The method also includes generating, using a second neural network, an implementation of the action based on the first state, the second state, and the indication of the action. In response to the implementation of the action being transmitted to the entity, a success metric, determined based on an outcome of the implementation of the action, is received. A third state associated with the entity is determined based on the success metric.

20 Claims, 8 Drawing Sheets

(56) References Cited

U.S. PATENT DOCUMENTS

| | | | |
|---|---|---|---|
| 2024/0126997 A1* | 4/2024 | Bent, III | G06F 40/166 |
| 2024/0135083 A1* | 4/2024 | Boronowsky | G06N 3/04 |
| 2024/0135263 A1* | 4/2024 | Hussain | G06N 3/006 |
| 2024/0320505 A1* | 9/2024 | Balakrishnan | G06N 3/092 |

OTHER PUBLICATIONS

Shen et al., "Large Language Model Alignment: a Survey," arXiv:2309.15025v1 [cs.CL] Sep. 26, 2023 (Year: 2023).*

Mendonca et al., "Graph-Based Skill Acquisition for Reinforcement Learning," ACM Comput. Surv. 52, 1, Article 6 (Feb. 2019), 26 pages (Year: 2019).*

Wang et al., "Measuring Structural Similarities in Finite MDPs," Proceedings of the Twenty-Eighth International Joint Conference on Artificial Intelligence (IJCAI-19) (Year: 2019).*

Ahmed et al., "Splitting Vertices in 2-Layer Graph Drawings," arXiv:2301.10872v2 [cs.CG] Apr. 15, 2023 (Year: 2023).*

Adomavicius et al., "Maximizing Aggregate Recommendation Diversity: a Graph-Theoretic Approach," Workshop on Novelty and Diversity in Recommender Systems (DiveRS 2011), held in conjunction with ACM RecSys 2011, Oct. 23, 2011, Chicago, Illinois, USA (Year: 2011).*

Lei et al., "Reinforcement Learning based Recommendation with Graph Convolutional Q-network," SIGIR '20, Jul. 25-30, 2020 (Year: 2020).*

Jasper—AI Writer | AI Marketing Co-Pilot (Sep. 9, 2023) Retrieved from https://web.archive.org/web/20230909073332/https:/www.jasper.ai/ [retrieved on Jan. 4, 2024], 15 pages.

Lavender—The #1 AI Sales Email Coach (Apr. 10, 2023) Retrieved from https://web.archive.org/web/20230410201727/https:/www.lavender.ai/ [retrieved on Jan. 4, 2024], 15 pages.

Slike Studio, Simple. Secure. Scalable. Video & Live Platform. (Mar. 17, 2023) Retrieved from https://web.archive.org/web/20230317094651/https:/www.slike.in/ [retrieved on Jan. 4, 2024], 6 pages.

Wikipedia, Matching (graph theory) (Sep. 22, 2023) Retrieved from https://web.archive.org/web/20230922173815/https://en.wikipedia.org/wiki/Matching_(graph_theory) [retrieved on Jan. 4, 2024], 8 pages.

Wikipedia, Maximum flow problem (Aug. 28, 2023) Retrieved from https://web.archive.org/web/20230828094042/https://en.wikipedia.org/wiki/Maximum_flow_problem [retrieved on Jan. 4, 2024], 15 pages.

Wizia (Sep. 21, 2023) Retrieved from https://web.archive.org/web/20230921224057/https:/wizia.com/ [retrieved on Jan. 4, 2024], 5 pages.

* cited by examiner

SYSTEMS AND METHODS FOR GENERATING MODELS TO IDENTIFY STATES AND ACTIONS

FIELD

One or more embodiments described herein relate to systems and computerized machine learning methods for calculating states and generating actions.

BACKGROUND

A future state can be determined based on a current state and an action. As such, it can be desirable to have systems configured to identify potential actions based on a predicted improvement to a current state.

SUMMARY

According to an embodiment, a method includes defining, via a processor, using a first neural network, and based on a plurality of inputs, a first state associated with (1) an entity and (2) a first node from a plurality of nodes included in a reinforcement learning model. The method also includes determining, via the processor, using the reinforcement learning model and based on a reward, (1) a second state associated with a second node from the plurality of nodes and (2) an indication of an action associated with a transition from the first state to the second state. The method also includes generating, via the processor and using a second neural network, an implementation of the action based on the first state, the second state, and the indication of the action. The method also includes receiving, at the processor and in response to the implementation of the action being transmitted to the entity, a success metric determined based on an outcome of the implementation of the action. The method also includes determining, via the processor, a third state associated with the entity based on the success metric.

According to an embodiment, a non-transitory processor-readable medium stores code representing instructions to be executed by one or more processors. The instructions include code to cause the one or more processors to receive input data associated with an entity. The code also causes the one or more processors to generate a current state for the entity based on the input data and using a large language model. The code also causes the one or more processors to identify, using a reinforcement learning model, an action from a plurality of actions based on a probability that the action will cause the entity to be associated with an improved state. The code also causes the one or more processors to generate, using a generative machine learning model, output data based on (1) the current state, (2) the improved state, and (3) the action. The output data is configured to effectuate the action.

According to an embodiment, a non-transitory processor-readable medium stores code representing instructions to be executed by one or more processors. The instructions include code to cause the one or more processors to generate, using a transformer model, a representation of a current state associated with at least one of an individual or a group. The code also causes the one or more processors to identify, using a reinforcement learning model and based on a reward, an action associated with a transition from the current state to a predicted state. The code also causes the one or more processors to generate, using a machine learning model and based on the action, data that is associated with the action and that is to be transmitted to the at least one of the individual or the group. The code also causes the one or more processors to receive an indication of an outcome that is associated with the action and that results from the data being transmitted to the at least one of the individual or the group. The code also causes the one or more processors to determine, based on the indication of the outcome, whether the at least one of the individual or the group is associated with the predicted state as a result of the data being transmitted to the at least one of the individual or the group.

DETAILED DESCRIPTION

Figure 1:
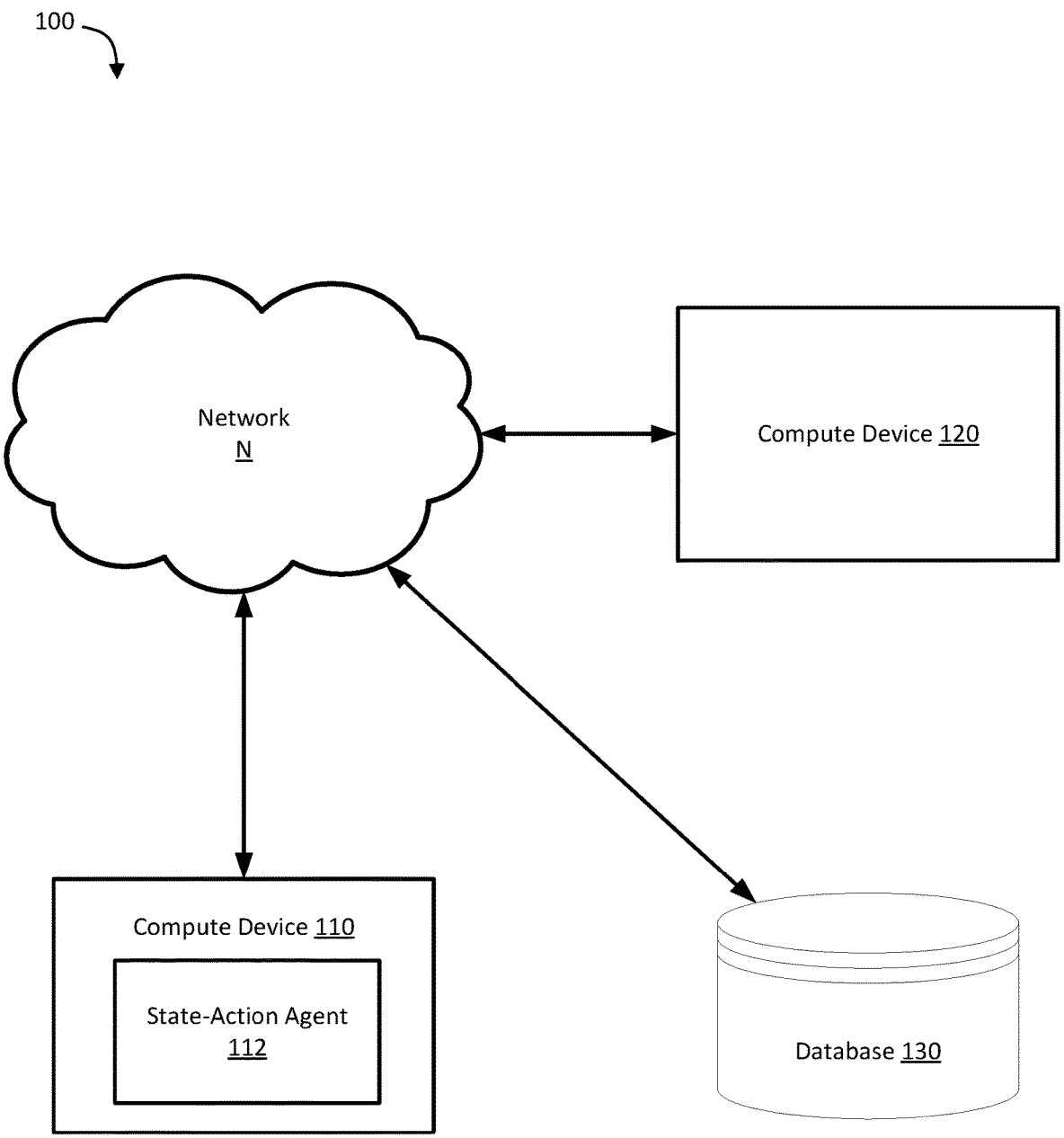
FIG. 1 is a schematic diagram of a system, according to an embodiment.

FIG. 1 is a schematic diagram of a system 100 for calculating and/or predicting effects of actions and/or activities on a state, according to one embodiment. In some implementations, the state can be associated with a level engagement, and the actions and/or activities can be associated with a communication and/or sent item (e.g., an email, phone call and/or phone script, short message service (SMS) text message, social media post and/or message, gift, and/or the like). For example, the system 100 can be configured to automatically and/or autonomously contact a prospective customer(s) and/or increase engagement of an existing customer(s), as described herein. The system 100 includes compute devices 110 and 120, database 130, and network N. The system 100 can include alternative configurations, and various steps and/or functions of the processes described below can be shared among the various devices of the system 100 or can be assigned to specific devices (e.g., the compute devices 110 and 120, the database 130, and/or the like).

Each of the compute devices 110 and/or 120 can include any suitable hardware-based computing devices and/or multimedia devices, such as, for example, a server, a desktop compute device, a smartphone, a tablet, a wearable device, a laptop and/or the like. In some implementations, the compute devices 110 and/or 120 can be implemented at an edge node or other remote computing facility. In some implementations, each of the compute devices 110 and/or 120 can be a data center or other control facility configured to run a distributed computing system and can communicate with other compute devices. As described herein, at least one of the compute devices 110 and/or 120 can be used for implementing the models, running an application, generating an action(s), providing feedback to a server, and/or otherwise implementing steps in a method (e.g., a prospect and/or customer engagement method, as described herein).

In some implementations, the system 100 can include a distributed computing system implemented by three or more compute devices (e.g., one or more compute devices in addition to the compute devices 110 and 120 shown in FIG. 1). In some examples, each of a plurality of compute devices can include one or more of processors, respectively, and one or more memories. The processors can function similar to the processor 220 in FIG. 2, as described herein. The memories can function similar to memory 210 in FIG. 2, as described below. In some implementations, as further described herein, a reward can be based on the establishment of a prospect/customer pipeline. For example, a reward can be associated with an entry of a new prospect to a pipeline (e.g., list, roster, and/or the like) of prospects (e.g., individuals and/or entities) for which actions can be generated to elicit engagement.

The compute device 110 can be configured to execute (e.g., via a processor) a state-action agent 112. The state-action agent 112 can include instructions which, when executed by a processor (e.g., the processor 220 of FIG. 2, as described herein), cause the compute device 110 to perform various steps and/or functions (e.g., implementing an improved framework model and other algorithms), as described herein. The state-action agent 112 can further include instructions for generating a user interface (e.g., graphical user interface (GUI)) that is configured to collect information from a user and/or display predicted/generated data and/or recommendations. In some instances, the compute device 110 can be an edge node from a plurality of edge nodes communicatively coupled via a network, as described herein.

In some implementations, the compute device 120 can be associated with, for example, an entity (e.g., an identity, a prospect and/or an existing customer) to be acted upon by an action generated, at least in part, by the state-action agent 112 of the compute device 110, as described herein. In some instances, the action(s) can be taken with respect to the compute device 120 via the network N (e.g., communication(s) can be transmitted to the compute device 120 to cause the compute device 120 to execute an action). Alternatively or in addition, the compute device 120 can be configured to generate and/or execute (e.g., effectuate and/or implement) an action determined via the compute device 110 and to be directed to an entity, as described herein. In some implementations, the compute device 120 can be further configured to generate a response (e.g., a success metric and/or a feedback indication) based on an outcome of the action being performed on the entity associated with the compute device 120, as described herein.

In some instances, the state-action agent 112 can include a computational framework (e.g., an optimization framework) that determines a state(s) and an action(s) based on that state(s). In some implementations, the state(s) can be associated with, for example, an entity (e.g., a customer) that can include an individual or group (e.g., a business and/or enterprise). In some implementations, the state-action agent 112 can categorize (e.g., classify and/or predict) a state from a plurality of states that includes, for example, (1) a prospect that has been contacted and/or called (e.g., via the compute device 120, as described herein) but has yet to receive a post-call follow-up (e.g., with an email); (2) a prospect that has engaged with a communication (e.g., by clicking links and/or reading an email generated using the state-action agent 112); (3) a cold prospect; (4) a prospect served by a competitor but that is considering switching providers; (5) a prospect that has yet to be contacted (but that, for example, looks similar to a profile/prospect of a prospect that has previously been contacted/targeted); or (6) a similar such state(s) associated with a prospect, client, customer, and/or the like. In some instances, a state can include, for example, a persona profile of a company, a persona profile of an individual (e.g., an individual at a company), an indication of implicit engagement (e.g., opening an email) through a channel (e.g., a communication channel, such as email), an indication of explicit engagement (e.g., replying to an email within an active deal cycle, liking a social media post, and/or the like), and/or a profile based on a history of interactions (e.g., that are accumulated/archived using customer relationship management (CRM) software, as described herein).

The state-action agent 112 can generate a classification that indicates a state of a prospect using a large language model (LLM) configured to classify text. The large language model can include, for example, a neural network (e.g., a recurrent neural network or a transformer model) or any other model suitable for natural language processing. The text can be included in data associated with a platform, as described herein.

In some instances, the state-action agent 112 can determine a current state associated with a reward. For example, for a state associated with a current customer (e.g., a prospect that has been converted to a customer, client, etc.), the state can be additionally associated with a reward that is, for example, based on/proportional to the lifetime value of the customer. This lifetime value can be based on, for example, a fee received from the customer. A reward can also be based on/proportional to, for example, a number of products purchased by the customer and/or expected business growth attributable to the customer. In some implementations, a reward function can be used to represent at least one of an identification status, an engagement status, a received revenue/profit status, an expected revenue/profit status, and/or any other representation of a magnitude of expected entity engagement.

As described herein, in some implementations, the state-action agent 112 can be configured to represent a plurality of states using, for example, a Markov Decision Process (MDP) or any other framework configured for modelling decision making. The MDP can include, for example, a plurality of nodes (e.g., a state space), where each node can be associated with a different state that can be associated with an entity. Each state (e.g., node) can be associated with at least one action (e.g., from an action space that includes a plurality of actions) that can cause a transition to a different state (e.g., node) from the plurality of states (e.g., nodes). For example, an MDP can define a state(s) from which an action(s) is taken and a state(s) that is predicted to be achieved as a result of undertaking the action(s). An action can include, for example, transmitting a communication (e.g., a message) via a phone call, email, mail, social media, and/or the like. An action can also include, for example, transmitting a specific message (e.g., a selected word, phrase, sentence, paragraph, message body, and/or the like) within the communication.

The state-action agent 112 can further include a reinforcement learning model configured to predict an action(s) that can cause a transition to a state (e.g., an improved and/or predicted state) within the MDP and result in an increased reward. The improved state can be associated with, for example, an improved level of engagement as compared to a current level of engagement associated with the current state. The reinforcement learning model can be configured to use past/historical experience (e.g., past outcomes that are provided to the reinforcement learning model as training feedback) to determine an action that can lead to the improved state as measured by the increased reward. For example, the past outcomes can be associated with an audience (e.g., a plurality of prospects previously targeted with actions) that does not include a prospect for which an action is being determined. The past outcomes can be associated with, for example, sales prospecting and/or client engagement and can be measured using, for example, a historical success metric (e.g., based on a number and/or frequency of past responses to and/or engagements with an action).

In some instances, training data for the reinforcement learning model can include, for example, past interactions with a particular user (e.g., a user associated with a state to be predicted using the reinforcement learning model), past interactions with a specific company and/or marketing campaign associated with that particular user, past interactions with others with similar demographics of that particular user, etc. The training data (e.g., past experience data) can be used by the reinforcement learning model to autonomously learn (e.g., via trial and error and/or without human intervention) an outcome (e.g., a predicted state with an associated reward) based on the action taken. In some implementations, the reinforcement learning model can be trained using supervised and/or unsupervised machine learning. In some implementations, the reinforcement learning model can be configured to use positive reinforcement to determine actions that can lead to preferred outcomes (e.g., preferred states). Positive reinforcement can include, for example, preferencing an action that had led to increased magnitude and/or frequency of a behavior/outcome (e.g., an increased magnitude/level of engagement) in a training sample. In some implementations, the reinforcement learning model can be configured to use negative reinforcement to determine actions. Negative reinforcement can include, for example, preferencing an action that has caused a condition to be reduced or avoided. For example, such as action can include a follow-up message directed to a prospect and configured to prevent the prospect from disengaging and/or forgetting about a service.

In some instances, a state can be associated with a terminal state, which can include, for example, a failed state and/or a success state. A failed state can include, for example, a state associated with a prospect that has not responded to and/or engaged with at least one action generated using the state-action agent 112 and/or a state associated with a prospect that has indicated their intention to unsubscribe. A success state can include, for example, a prospect that has been engaged by at least one action generated using the state-action agent. If the state-action agent 112 determines that a prospect's current state is a terminal state (e.g., a success state or a failed state), the state-action agent 112 can be configured to cause a cessation of communication to that prospect.

Having determined an action(s), the state-action agent 112 can be further configured to implement/effectuate the action(s) using, for example, a generative machine learning model (e.g., a generative neural network). A generative machine learning model can include, for example, a generative adversarial network, a mixture model (e.g., a Gaussian mixture model), a diffusion model, a large language model, a deep generative model, a variation autoencoder, an auto-regressive model, and/or any other model configured to generate new data based on existing data. Based on the determined action(s), the generative machine learning model can be configured to generate different types of data. For example, for a determined action associated with an email, post mail, social media post/message, and/or a phone script (e.g., to be read by a telephone/call center operator), the generative machine learning model can generate text data based on the current state of the entity as determined by the state-action agent 112. For example, if an entity for which the action is to be directed is associated with an "uncontacted" state, the generative machine learning model can be configured to generate text that conveys an introductory message (e.g., that includes an introduction to a product or service being marketed to the entity). If, for example, the entity is associated with a "contacted but no response received" state, the generative machine learning model can be configured to generate text that conveys a follow up or reminder message (e.g., a message that references a previously sent and/or introductory message). In some implementations, the state-action agent 112 can include a plurality of generative machine learning models that are each configured to generate a type of data. For example, the state-action agent 112 can include a generative machine learning model configured to generate text data, audio data, video data, image data, and/or the like. In some implementations, the generated data can be used by an automation platform to further implement and/or effectuate the action, as described herein. The generated data can include for example, an automation platform parameter associated with timing of a follow-up action (e.g., a time interval(s) between successive actions, time for a specific action, etc.), a tone of a message included in action (e.g., an urgent tone, a relaxed tone, etc.), a medium to use for implementing the action (e.g., email, phone call, mail, and/or the like), etc.

In some implementations, the state-action agent 112 can be configured to perform audience building based on entities that the state-action agent 112 has already processed. Audience building can include, for example, determining other entities to initiate contact with based on prospects that have been added to a pipeline of customers or potential customers (e.g., using the state-action agent 112). For example, the state-action agent 112 can classify a first entity as a potential customer based on first input data associated with the first entity. Having classified the first entity, the state-action agent 112 can be configured to assess the success of generated actions directed at the first entity. For example, the state-action agent 112 can be configured to determine whether the generated actions have resulted in increased engagement with the first entity. Based on the assessed success, the state-action agent 112 can identify a second entity associated with second input data based on at least one similarity between the first input data and the second input data. The at least one similarity can be associated with, for example, a common (as to the first and second entity) industry, company size, occupation/role, geographic location, demographic, etc.

The database 130 can include at least one memory, repository and/or other form of data storage. The database 130 can be in communication with compute devices 110 and/or 120 (e.g., via the network N). In some implementations, the database 130 can be housed in one or more of compute devices 110 and/or 120 or a separate compute device(s). The database 130 can be configured to store, for example, input data (e.g., platform data, as described herein) that can be retrieved or otherwise accessed by one or more compute devices, such as compute devices 110 and/or 120, to perform at least some of the features (e.g., in relation to the state-action agent 112) described herein. For example, in some implementations, the input data stored within the database 130 can include geographic location data (e.g., an indication(s) of a city, state, country, etc.) associated with a location of a prospect or customer. This geographic data can be used to determine, for example, whether an entity should be contacted based on whether the geographic data indicates that the entity is within a service area of interest.

The database 130 can include a computer storage, such as a hard drive, memory card, solid-state memory, ROM, RAM, DVD, CD-ROM, write-capable memory, and/or read-only memory. In addition, the database 130 may include a distributed storage system where data is stored on a plurality of different storage devices, which may be physically located at a same or different geographic location (e.g., in a distributed computing system). In some implementations, the database 130 can be associated with cloud-based/remote storage.

Database 130 can be networked, via the network N, to the compute devices 110 and/or 120 directly using wired connections and/or wireless connections. In some examples, the system 100 described herein can be implemented in a targeted advertisement and/or client engagement platform that is associated with the network N. The network N can include various configurations and protocols, including short range communication protocols such as, for example, Bluetooth®, Bluetooth® LE, the Internet, World Wide Web, intranets, virtual private networks, wide area networks, local networks, private networks using communication protocols proprietary to one or more companies, Ethernet, WiFi and HTTP, and various combinations of the foregoing. Such communication can be facilitated by any device capable of transmitting data to and from other compute devices, such as a modem(s) and/or a wireless interface(s).

Figure 2:
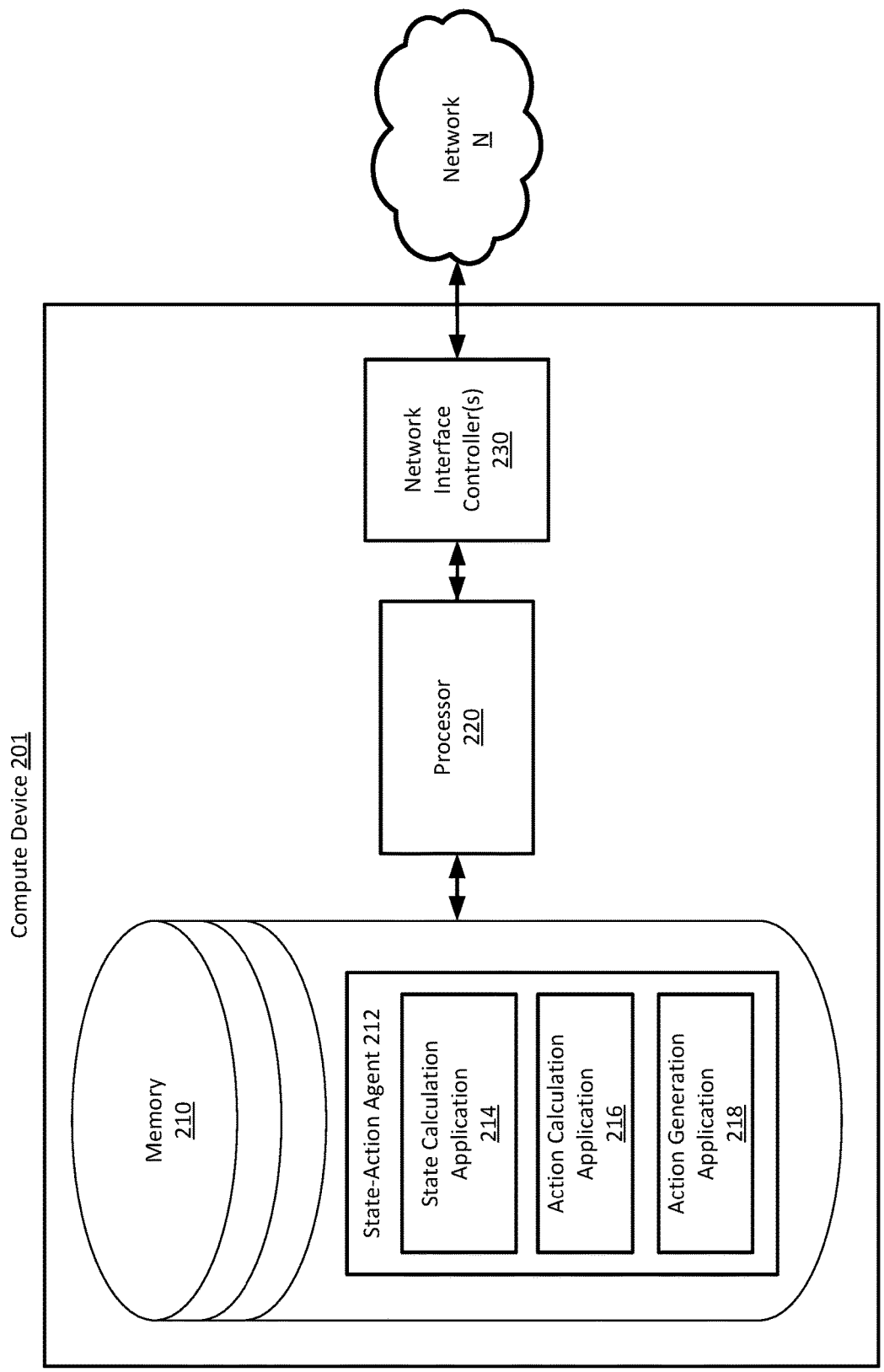
FIG. 2 is a schematic diagram of a compute device included in a system, according to an embodiment.

FIG. 2 is a schematic diagram of a compute device 201 of a system, according to an embodiment. The compute device 201 can be structurally and/or functionally similar to, for example, the compute devices 110 of the system 100 shown in FIG. 1. Compute device 201 can be a hardware-based computing device, a multimedia device, or a cloud-based device such as, for example, a computer device, a server, a desktop compute device, a laptop, a smartphone, a tablet, a wearable device, a remote computing infrastructure, and/or the like. Compute device 201 includes a memory 210, a processor 220, and one or more network interface controllers 230.

The processor 220 can be, for example, a hardware based integrated circuit (IC), or any other suitable processing device configured to run and/or execute a set of instructions or code (e.g., stored in memory 210). For example, the processor 220 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a remote cluster of one or more processors associated with a cloud-based computing infrastructure and/or the like. The processor 220 is operatively coupled to the memory 210 (described herein). In some embodiments, for example, the processor 220 can be coupled to the memory 210 through a system bus (for example, address bus, data bus and/or control bus).

The memory 210 can be, for example, a random-access memory (RAM), a memory buffer, a hard drive, a read-only memory (ROM), an erasable programmable read-only memory (EPROM), and/or the like. The memory 210 can store, for example, one or more software modules and/or code that can include instructions to cause the processor 220 to perform one or more processes, functions, and/or the like.

In some implementations, the memory 210 can be a portable memory (e.g., a flash drive, a portable hard disk, and/or the like) that can be operatively coupled to the processor 220. In some instances, the memory can be remotely operatively coupled with the compute device 201, for example, via the one or more network interface controllers 240. For example, a remote database server can be operatively coupled to the compute device 201.

The memory 210 can store various instructions associated with algorithms and/or data, including machine learning algorithms (e.g., generative machine learning models and/or reinforcement learning models, as described herein). Memory 210 can further include any non-transitory computer-readable storage medium for storing data and/or software that is executable by processor 220, and/or any other medium which may be used to store information that may be accessed by processor 220 to control the operation of the compute device 201. For example, the memory 210 can store data associated with the state-action agent 212. The state-action agent 212 can be functionally and/or structurally similar to the state-action agent 112 of FIG. 1.

The state-action agent 212 can include the state calculation application 214, the action calculation application 216, and the action generation application 218. The state calculation application 214 can include, for example, a large language model (e.g., the large language model 314 of FIG. 3, described herein) configured to determine a current state of a prospect based on data (e.g., text data) associated with that prospect, as described herein. The action calculation application 216 can include, for example, a reinforcement learning model (e.g., the reinforcement learning model 316 of FIG. 3, described herein) that can be associated with a Markov decision process (MDP). The reinforcement learning model can be configured to select a preferred action based on the current state determined by the state calculation application 214, an intrinsic reward associated with each state within the MDP, and/or a constraint(s), as described herein. For example, the action calculation application 216 can be configured to select an action based on a probability that the action can cause the prospect to be associated with an improved state. Said differently, the action calculation application 216 can determine an action by predicting a future state associated with improved engagement and that can result from executing the action. The action generation application 218 can be configured to implement, through generated data, a preferred action identified using the action calculation application 216. The action generation application 218 can include a generative machine learning model (e.g., the generative model 318) configured to generate data associated with the preferred action, as described herein.

The one or more network interface controllers 230 can be configured to connect to the network N using any of the wired and wireless short range communication protocols described above, as well as a cellular data network, a satellite network, free space optical network and/or the Internet.

In some instances, the compute device 201 can further include a display, an input device, and/or an output module (not shown in FIG. 2). The display can be any display device by which the compute device 201 can output and/or display data. The input device can include a mouse, keyboard, touch screen, voice interface, and/or any other hand-held controller or device or interface via which a user may interact with the compute device 201. The output module can include a bus, port, and/or other interfaces by which the compute device 201 may connect to and/or output data to other devices and/or peripherals.

Figure 3:
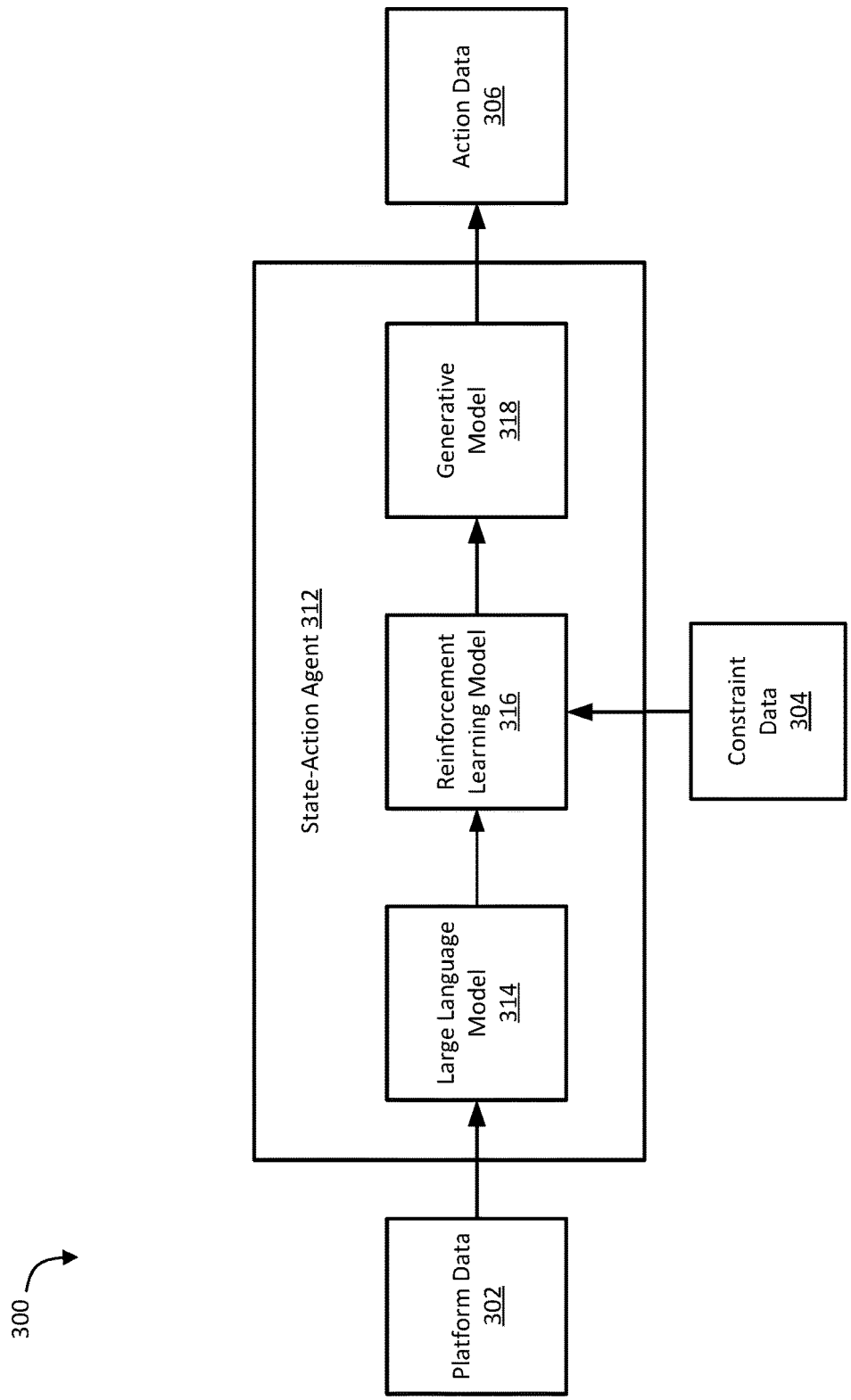
FIG. 3 is a schematic diagram of an improved framework model that is included in a system, according to an embodiment.

FIG. 3 is a schematic diagram of a framework 300 for generating state predictions and actions, according to an embodiment. The framework 300 can be associated with a compute device (e.g., a compute device that is structurally and/or functionally similar to the compute device 201 of FIG. 2 and/or the compute devices 110-120 of FIG. 1). In some instances, for example, the framework 300 can be implemented as software stored in memory 210 and configured to be executed via the processor 220 of FIG. 2. In some instances, for example, at least a portion of the framework 300 can be implemented in hardware. The framework 300 includes platform data 302, a state-action agent 312, constraint data 304, and action data 306. The state-action agent 312 can be structurally and/or functionally similar to the state-action agents 112, 212, and/or 512. The state-action agent 312 can include the large language model 314, the reinforcement learning model 316, and the generative model 318.

The large language model 314 can be configured to identify a current state associated with a prospect based on platform data 302 relevant to that prospect. The platform data 302 can be associated with, for example, at least one sales, marketing, and/or enterprise platform, as is discussed in relation to FIGS. 4 and 5. The platform data 302 can include text data that the large language model 314 is configured to classify.

The reinforcement learning model 316 can be associated with a Markov decision process (MDP), as described herein. The MDP can include a plurality of states that can define a prospect's status. Based on the current state identified using the large language model 314, the reinforcement learning model 316 can locate that current state within the MDP. The reinforcement learning model 316 can then identify a preferred action based on a learned expectation (e.g., a probability) that the preferred action will evolve the prospect's state or maintain the prospect's current state (e.g., maintain a status quo). The expectation/probability can be determined based on empirical data that includes a set of outcomes that results from a set of actions. For example, a probability can be determined based on a number of instances from a plurality of instances that an action applied to an entity having a state (e.g., a first level of engagement) that state being improved (e.g., the action caused the entity to have a second level of engagement). In some instances, the reinforcement learning model 316 can select, from a plurality of actions, an action associated with a predicted outcome that is more preferable than an outcome(s) associated with a remaining action(s) from the plurality of actions. The reinforcement learning model 316 can select the preferred action based on an intrinsic reward associated with each state within the MDP. The spectrum of rewards can include, for example, a zero reward (e.g., associated with an unsubscribed state), and/or a reward associated with a potential customer state, where that reward can be proportional to the prospective contract value.

The reinforcement learning model 316 can be further configured to determine a preferred action based on the constraint data 304. The constraint data 304 can include, for example, a limit on a number of actions to be taken using the system (e.g., within a time period and/or for a given prospect/contact). In some instances, the constraint data 304 can be based on a resource capacity (e.g., labor capacity), or cost/expense limitation. For example, the constraint data 304 can define a limit to a number of emails to be sent, a limit to a number of phone call tasks that a sales development representative (SDR) can handle, and/or a limit to a number of social tasks an SDR can handle. A cost/expense can be associated with implementing an action. For example, an action can include sending a gift(s) and/or promotional materials to a prospect/customer, and an expense-based constraint can limit a value of the gift(s) and/or promotional materials. The expense-based constraint can also limit a frequency at which materials are sent to reduce cost. Given the constraint data 304, the state-action agent 312 can select an action. In some implementations, the constraint can be configured to prevent an action based on a probability that the action may annoy a target prospect. For example, such a constraint can be associated with an agitation metric that limits a frequency of an action (e.g., a number of messages that are sent to a target during a given time period.

In some implementations, the constraint data 304 can be applied by first determining, using the state-action agent 312, an action for each prospect from a list of prospects based on an incremental gain in reward for that action. The state-action agent 312 can then sort tuples, where a tuple includes a prospect-action pair (e.g., a prospect and its associated action). The tuples can be sorted based on the expected gain in reward and can select the highest ranked action (e.g., from the determined actions) that does not violate a constraint(s) defined by the constraint data 304. Having performed that action, the state-action agent 312 can select a next highest ranked action that does not violate a constraint(s), and the state-action agent 312 can continue the selecting until no further action(s) can be performed without violating a constraint(s).

In some implementations, the constraint data 304 can be applied within a constrained improvement framework. Visually, this constrained improvement framework can be associated with a bipartite graph, where the left side of the graph includes indications of prospects. The right side of the graph can include indications of actions, such as emails, phone calls, LinkedIn tasks, etc. The graph can further include edges that connect a prospect to a respective action. Each edge can be associated with the expected gain in reward for performing that action for that prospect. The right side of the graph can further include constraints (e.g., a number of permitted phone calls, emails, and/or LinkedIn tasks, that can be performed). The resulting bi-partite graph can be cast as a bi-partite maximum flow problem. Specifically, a source vertex can be assigned and associated (via edges) with prospects (e.g., left-side data/vertices), and a sink vertex can be assigned and associated (via edges) with actions (e.g., right-side data/vertices). A capacity of the "actions-to-sink" edges can be defined to be equivalent to a number defined by an associated constraint (e.g., a limit number of that type of action that can be performed). Each "source-to-prospect" edge can have a capacity of one/a single unit. The capacity of the "prospect-to-action" edges can have a capacity equivalent to the associated expected gain in reward as determined by the reinforcement learning model 316.

Using the bipartite graph, an increased flow, reduced cut (e.g., maximum flow, minimum cut) problem can be defined and solved for to select assignments of prospects to actions that increases the total expected gain in rewards based on the constraint data 304. In some implementations, a right partition vertex (e.g., a vertex associated with an action) can be split into a number of vertices that is equivalent to a number of constraints for that action. Then, instead of assigning a source and sink vector, a maximum bipartite matching problem can be solved to result in an assignment of prospects to actions. Solving this problem can be performed more quickly (e.g., via a processor) if constraints are smaller in integral values.

Having determined a preferred action(s), the state-action agent 112 can be further configured to use the generative model 318 to implement/effectuate the preferred action(s). For example, the generative model 318 can be configured to generate action data 306, which can include, for example, text data, image data, video data, audio data, and/or the like. In some implementations, the action data 306 can include data to be used by an automation platform to further effectuate/implement the preferred action(s), as described in relation to FIG. 5.

In some implementations, the state-action agent 312 can be configured to receive a query from a user and, in response to receiving the query, automatically (e.g., without human intervention) determine a preferred action based on the query. For example, the query from the user can include a description of a prospect and/or customer and their current state. Such a query can include, for example, the text description, "Customer Z answered my call but promptly hung up on me." Based on this text description, the state-action agent 312 can be configured to generate a preferred action to improve a state associated with Customer Z (e.g., cause Customer Z to be re-engaged). In some instances, the state-action agent 312 can augment the input query received from the user with the platform data 302 that is relevant to the subject (e.g., Customer Z) of the query. The augmented input data can then be used to determine a preferred action based on the state described in the query. In some instances, the query can include a request for a compilation of prospects and/or customers in a pipeline that are likely (e.g., based on a probability threshold) to be interested in a product, service, and/or the like. For example, a query can include a text description of a new product, and the state-action agent 312 can be configured to return a list, a set of prospects and/or a set of entities having an associated state that indicates that they are likely to be interested in the new product.

Figure 4:
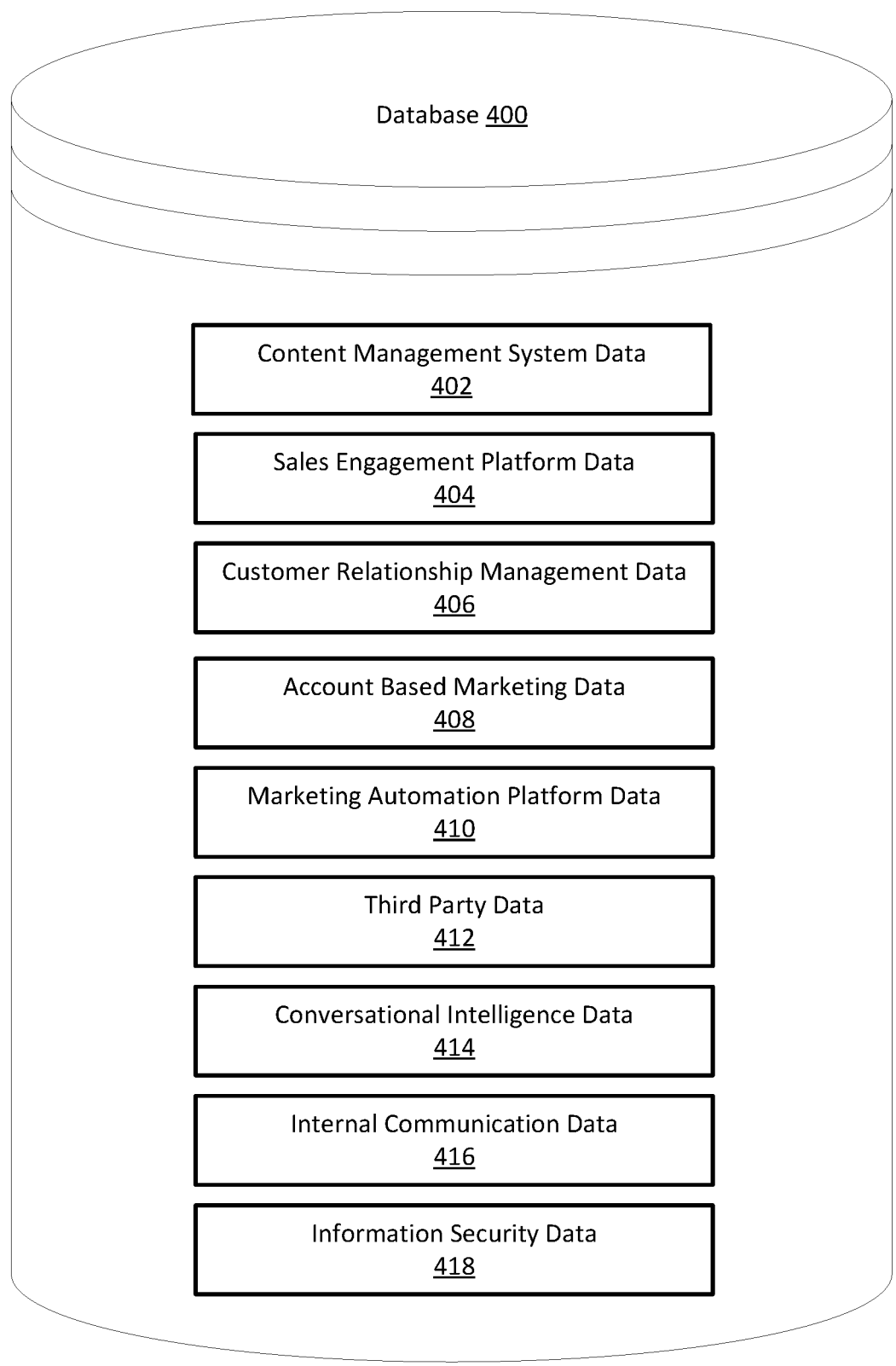
FIG. 4 is a schematic diagram of a database that is included in a system, according to an embodiment.

FIG. 4 is a schematic diagram of a database 400, according to one embodiment. The database 400 can be structurally and/or functionally similar to the database 130 of FIG. 1. In some instances, the database 400 can include a plurality of databases, where the databases are disposed remotely as to each other and/or a compute device (e.g., the compute devices 110 and/or 120 of FIG. 1). In some instances, the databases from the plurality of databases included in the database 400 can each be associated with a platform. The database 400 can be configured to store platform data (e.g., data informationally equivalent to the platform data 302 of FIG. 3). The platform data can be used (e.g., as input data) by a state-action agent (e.g., a state-action agent functionally and/or structurally equivalent to the state-action agents 112, 212, and/or 312) to create a feature set for a reinforcement learning model (e.g., the reinforcement learning model 316 of FIG. 3) to determine an action for client engagement and/or sales prospecting, as described herein. The platform data stored at the database 400 can include content management system (CMS) data 402, sales engagement platform (SEP) data 404, customer relationship management (CRM) data 406, account-based marketing (ABM) data 408, marketing automation platform (MAP) data 410, third party data 412, conversational intelligence data 414, internal communication data 416, and information security data 418. Although not shown in FIG. 4, in some implementations, the database 400 can store similar data suitable for predicting states and actions to increase a reward(s). In some instances, the data described herein (e.g., the platform data) can be received from a platform(s) in real-time (e.g., without first storing the data in a database) as requested by the state-action agent.

CMS data 402 can be associated with a platform that can include, for example, Seismic, HighSpot®, Showpad®, and/or a similar application configured to create, manage, and/or modify digital content (e.g., content on a website). SEP data 404 can be associated with a platform that can include, for example, SalesLoft®, Outreach®, Apollo®, and/or a similar platform configured to plan, execute, track, measure, and/or optimize interactions between sales teams and customers. CRM data 406 can be associated with a platform that can include, for example, Salesforce®, HubSpot®, Dynamics®, and/or a similar platform configured to manage a company's relationships and interactions with customers and/or potential customers. ABM data 408 can be associated with a platform that can include, for example, a key account marketing system that considers and communicates with individual prospect or customer accounts as markets of one. MAP data 410 can be associated with a platform that can include, for example, Marketio®, HubSpot®, Keap®, Brevo®, Mailchimp®, and/or a similar platform configured to automate marketing work. Although not shown in FIG. 4, the database 400 can store other types of data, including request for proposal (RFP) data, which can include data associated with a bidding process or a procurement process of a commodity, service, asset, and/or the like. RFP data can be associated with a platform that can include, for example, RFPIO®, Loopio®, and/or the like.

Third party data 412 can be associated with a platform that can include, for example, Apollo.io®, ZoomInfo®, a social media platform, and/or a similar platform that can provide data/information about a prospect irrespective of whether that prospect is included in an enterprise-controlled platform (e.g., a platform associated with CRM, SEP, MAP, and/or ABM). In some instances, the third party data 412 can be acquired using web-scraping techniques and/or via application programming interfaces (APIs) associated with such third-parties. The conversational intelligence data 414 can be associated with a platform that can include, for example, Gong®, ZI Chorus®, and/or a platform configured to analyze (e.g., using machine learning) an interaction between, for example, an enterprise and a customer. The internal communication data 416 can include, for example, communication between two employees (e.g., sales representatives) of a company, where that communication includes a discussion of and/or reference to a prospect and/or customer. The internal communication data 416 can also include, for example, data generated (e.g., scraped) from communications that involve a prospect and/or customer (e.g., communications between a sales team and a prospect and/or customer, communication between customers and/or prospects, etc.). These communications can include, for example, email, phone calls, instant messaging (e.g., Zoom® messages, Teams® messages, LinkedIn® messages, Slack® channels and/or messages, etc.), and/or the like. The information security (e.g., InfoSec) data 418 can include, for example, sensitive business data deployed within a system configured to protect that data from modification, disruption, destruction, and/or inspection. The information security data 418 can be associated with a platform that can include, for example, Drata®, Vanta®, etc. Although not shown in FIG. 4, the database 400 can also store data associated with product descriptions, product documentation (e.g., requirements data), technical data and/or specifications, integration specifications and/or data, and/or the like.

Figure 5:
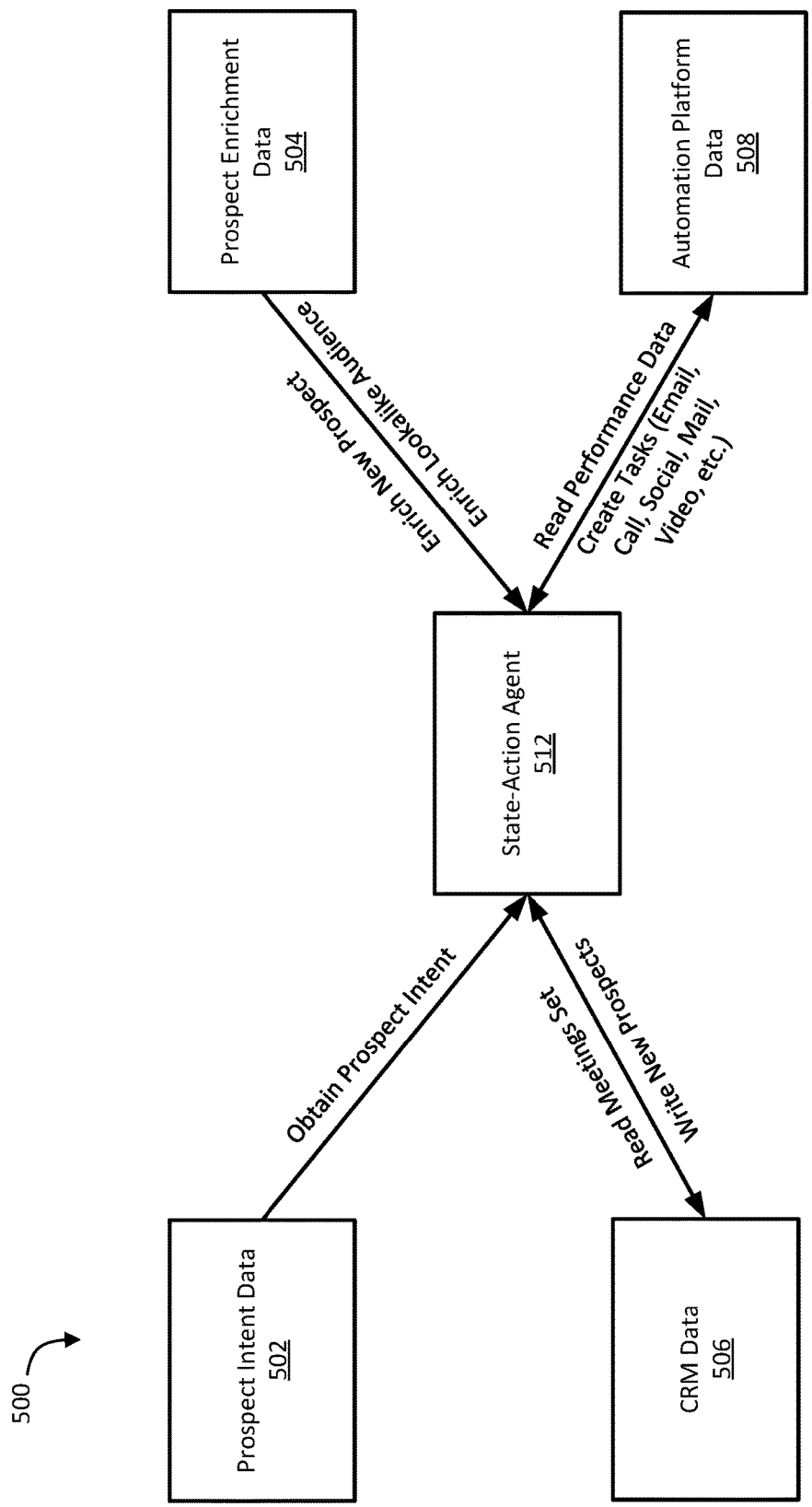
FIG. 5 is a schematic diagram of data flow that is implemented using a system, according to an embodiment.

FIG. 5 is a schematic diagram of a data interaction framework 500 that is implemented using a system, according to an embodiment. The data interaction framework 500 can be implemented using a system that is functionally and/or structurally similar to, for example, the system 100 of FIG. 1. The data interaction framework 500 can include and/or use prospect intent data 502 (e.g., data that includes intent signals generated by, for example, an ABM platform, such as 6Sense® and/or Demandbase®), CRM data 506 (e.g., CRM data that is informationally equivalent to the CRM data 406 of FIG. 4), prospect enrichment data 504 (e.g., data that is informationally equivalent to the third party data 412 of FIG. 4), and automation platform data 508. Although not shown in FIG. 5, the data interaction framework 500 can include and/or use data included and/or stored in the database 400 of FIG. 4, and/or the like. The state-action agent 512 (e.g., a state-action agent structurally and/or functionally equivalent to the state action agents 112, 212, and/or 312) can be configured to read (e.g., receive) the prospect intent data 502, the prospect enrichment data 504, and/or the CRM data 506 to predict a state(s) for an entity (e.g., a sales prospect) associated with the read data. In some implementations, the state-action agent 512 can read and/or use the data included and/or stored in the database 400 of FIG. 4. In some implementations, the state-action agent 512 can be configured to write CRM data 506 associated with the predicted state(s) to a CRM platform, such that the predicted state(s) can be archived and/or recorded for a given prospect.

Based on the predicted state(s), the state-action agent 512 can determine an action(s) configured to improve the state of the given entity. In some implementations, the state-action agent 512 can generate the automation platform data 508 to cause an automation platform to effectuate/implement the determined action. An automation platform can include, for example, a direct mail platform (e.g., Alyce®, Sendoso®, Postal®, etc.), a video platform (e.g., Vidyard®, Hippo Video®, etc.), a caller/dialer (e.g., Orum.com®, Power-Dialer®, etc.), and/or Salesloft®, Outreach®, HubSpot®, etc. In some implementations, the state-action agent 512 can be further configured to receive, from the automation platform(s), automation platform data 508 that includes performic data (e.g., data associated with a success metric(s)) that can indicate an outcome (e.g., a target prospect's response and/or engagement) as a result of the determined action being implemented/effectuated.

Figure 6:
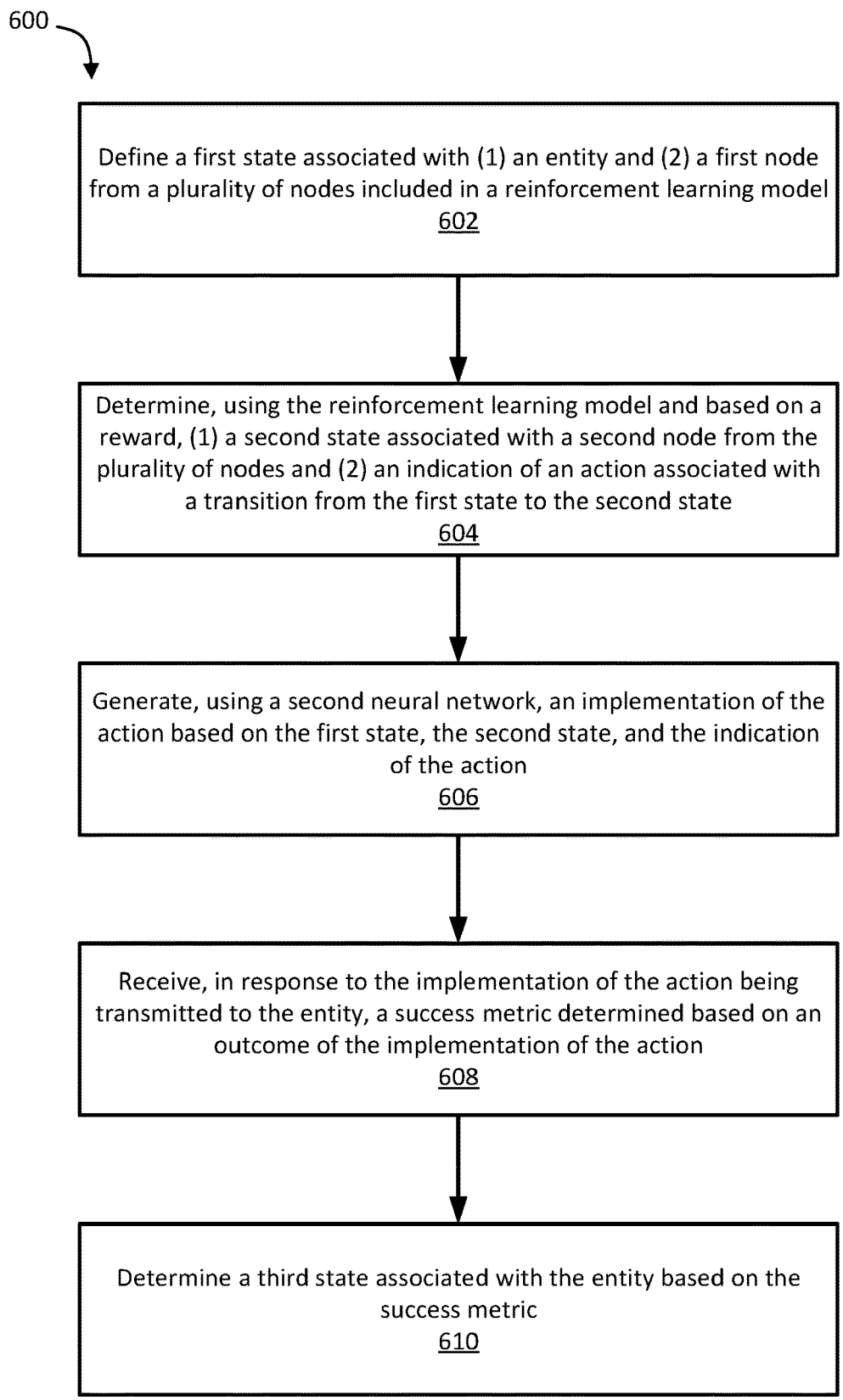
FIG. 6 is a flowchart showing a method of using a system to generate an action based on a predicted state, according to an embodiment.

FIG. 6 is a flowchart showing a method 600 illustrating an example implementation using a system described herein (e.g., the system 100 of FIG. 1). Portions of the method 600 can be implemented using a processor (e.g., the processor 220 of FIG. 2) of any suitable compute device (e.g., the compute device 110 of FIG. 1 and/or the compute device 201 of FIG. 2). The method 600 can include a method of generating an action based on a predicted state.

At 602, the method 600 includes defining, via a processor, using a first neural network, and based on a plurality of inputs, a first state associated with (1) an entity and (2) a first node from a plurality of nodes included in a reinforcement learning model. The method 600 at 604 includes determining, via the processor, using the reinforcement learning model and based on a reward, (1) a second state associated with a second node from the plurality of nodes and (2) an indication of an action associated with a transition from the first state to the second state. At 606, the method 600 includes generating, via the processor and using a second neural network, an implementation of the action based on the first state, the second state, and the indication of the action. In response to the implementation of the action being transmitted to the entity, at 608, a success metric is received. The success metric is determined based on an outcome of the implementation of the action. The method 600 at 610 includes determining, via the processor, a third state associated with the entity based on the success metric.

Figure 7:
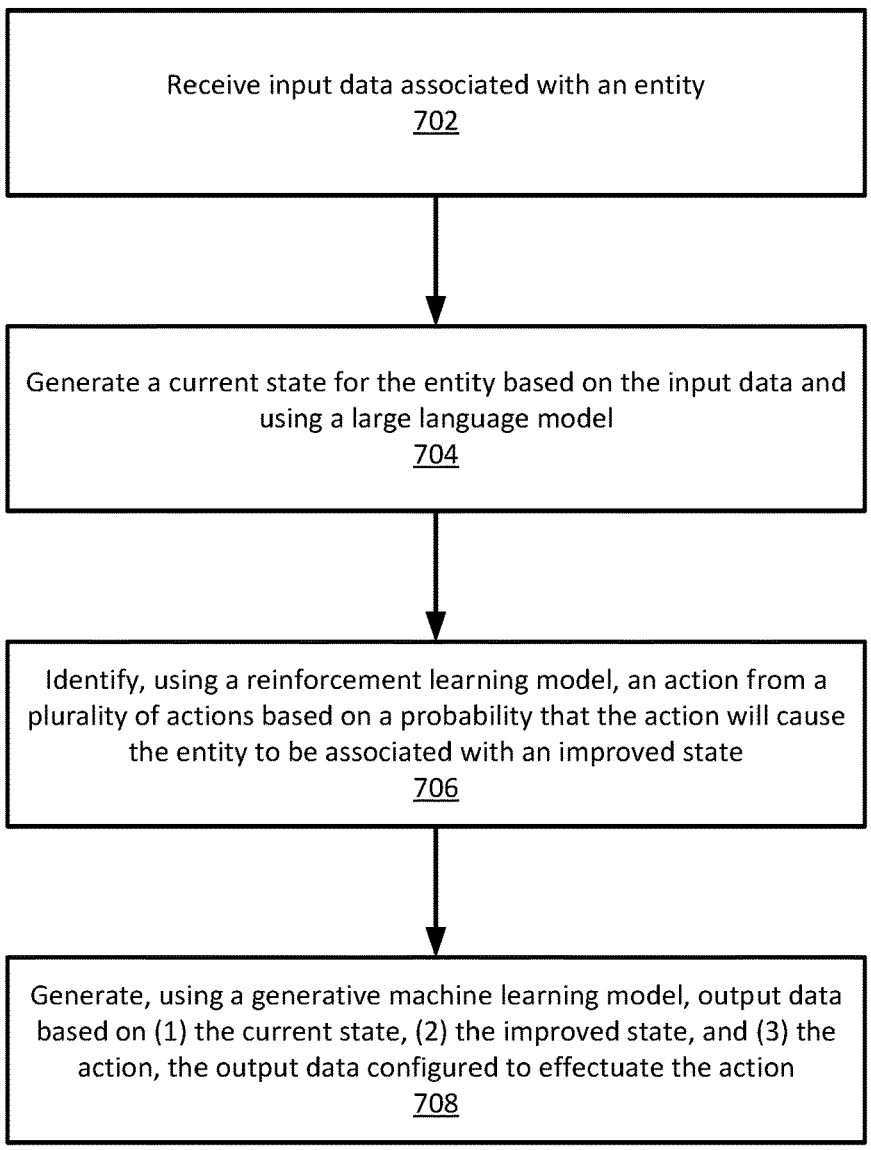
FIG. 7 is a flowchart showing a method of using a system to generate an action based on a predicted state, according to an embodiment.

FIG. 7 is a flowchart showing a method 700 illustrating an example implementation using a system described herein (e.g., the system 100 of FIG. 1). Portions of the method 700 can be implemented using a processor (e.g., the processor 220 of FIG. 2) of any suitable compute device (e.g., the compute device 110 of FIG. 1 and/or the compute device 201 of FIG. 2). The method 700 can include a method of generating an action based on a predicted state.

At 702, the method 700 includes receiving input data associated with an entity. At 704, the method 700 includes generating a current state for the entity based on the input data and using a large language model. A reinforcement learning model is used to identify an action at 706. The action is selected from a plurality of actions based on a probability that the action will cause the entity to be associated with an improved state. The method 700 at 708 includes generating, using a generative machine learning model, output data based on (1) the current state, (2) the improved state, and (3) the action, the output data configured to effectuate the action.

Figure 8:
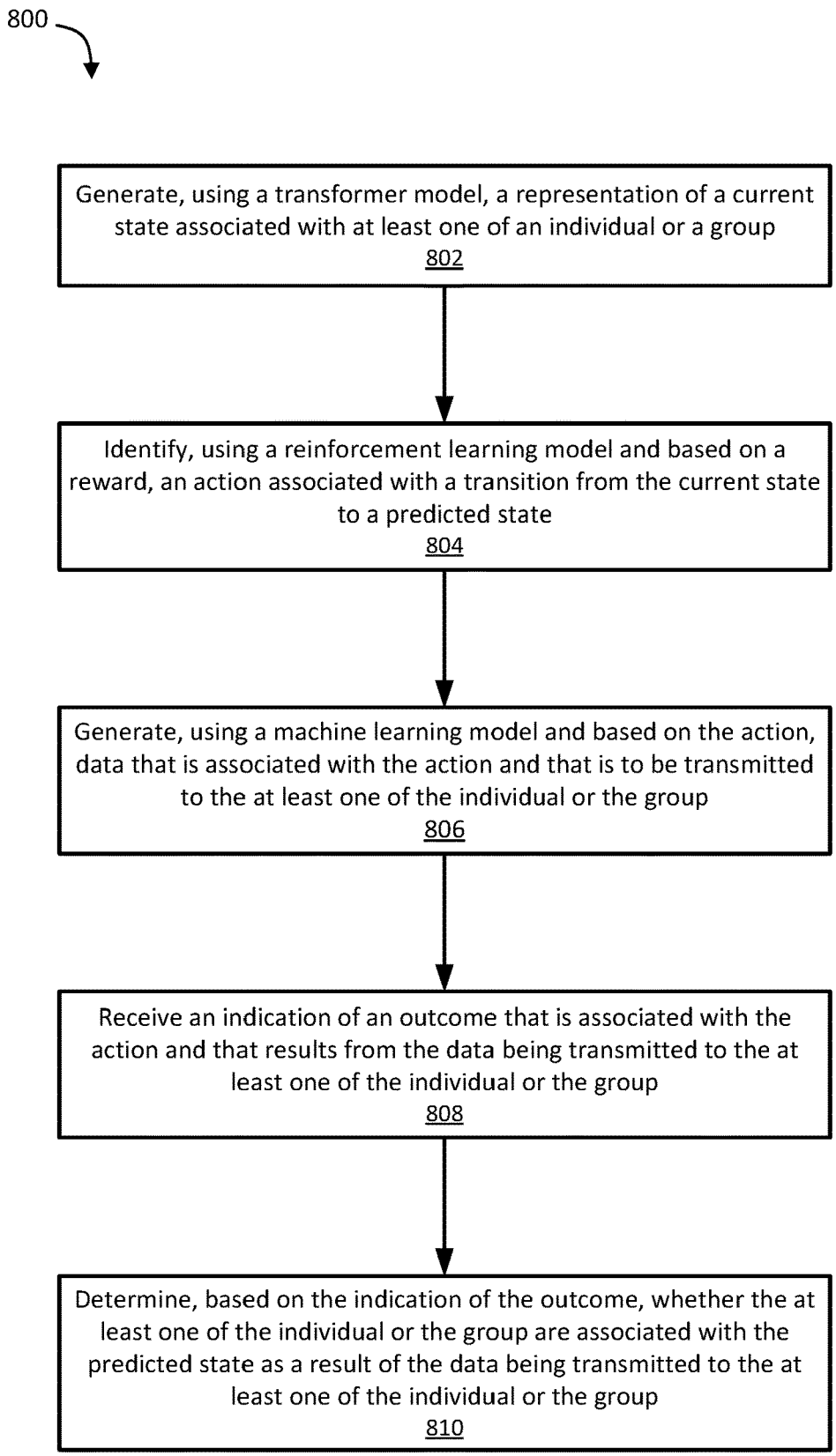
FIG. 8 is a flowchart showing a method of using a system to generate an action based on a predicted state, according to an embodiment.

FIG. 8 is a flowchart showing a method 800 illustrating an example implementation using a system described herein (e.g., the system 100 of FIG. 1). Portions of the method 800 can be implemented using a processor (e.g., the processor 220 of FIG. 2) of any suitable compute device (e.g., the compute device 110 of FIG. 1 and/or the compute device 201 of FIG. 2). The method 800 can include a method of generating an action based on a predicted state.

At 802, the method 800 includes generating, using a transformer model, a representation of a current state associated with at least one of an individual or a group. The method 800 at 804 includes using a reinforcement learning model to identify an action based on a reward. The action is associated with a transition from the current state to a predicted state. At 806, the method 800 includes generating, using a machine learning model and based on the action, data that is associated with the action and that is to be transmitted to the at least one of the individual or the group. An indication of an outcome that is associated with the action and that results from the data being transmitted to the at least one of the individual or the group is received at 808. The method 800 at 810 includes determining, based on the indication of the outcome, whether the at least one of the individual or the group are associated with the predicted state as a result of the data being transmitted to the at least one of the individual or the group.

In at least one embodiment, as described above, the systems (e.g., the system 100 of FIG. 1) and/or methods (e.g., the methods 600, 700, and/or 800) herein can be used, for example, for sales prospecting, audience/pipeline building, customer engagement, targeted advertising/marketing, and/or the like. Alternatively or in addition, these systems and methods can be used in other applications that include determining states and/or actions to cause a desired state. For example, the systems and methods described herein can be used in the context of public relations, education, financial forecasting/trading, manufacturing, business strategy, etc.

In an embodiment, a method includes defining, via a processor, using a first neural network, and based on a plurality of inputs, a first state associated with (1) an entity and (2) a first node from a plurality of nodes included in a reinforcement learning model. The method also includes determining, via the processor, using the reinforcement learning model and based on a reward, (1) a second state associated with a second node from the plurality of nodes and (2) an indication of an action associated with a transition from the first state to the second state. The method also includes generating, via the processor and using a second neural network, an implementation of the action based on the first state, the second state, and the indication of the action. The method also includes receiving, at the processor and in response to the implementation of the action being transmitted to the entity, a success metric determined based on an outcome of the implementation of the action. The method also includes determining, via the processor, a third state associated with the entity based on the success metric.

In some implementations, the entity can be a first entity, the action can include a communication to be transmitted to the entity, and the indication of the action can be determined based further on a historical success metric associated with a previous communication transmitted to at least one of the first entity or a second entity. The reward can determine a magnitude of expected entity engagement based on the historical success metric. In some implementations, the first neural network can include a large language model, and the reinforcement learning model can be implemented in part using a Markov decision process. In some implementations, the second neural network can be a generative neural network, and the implementation of the action can include at least one of text data, audio data, image data, or video data. In some implementations, the entity can be a first entity, the plurality of inputs can be a first plurality of inputs, the action can be a first action, and the method can further include determining, via the processor and based on the first plurality of inputs, a second entity. The method can also include determining, via the processor, a second action to be directed at the second entity based on a second plurality of inputs associated with the second entity.

In some implementations, the indication of the action can be determined based further on at least one of a constraint or a terminal state associated with the entity. In some implementations, the constraint can be associated with at least one of a frequency of the action, a resource capacity associated with the implementation of the action, or an expense associated with the implementation of the action.

In an embodiment, a non-transitory processor-readable medium stores code representing instructions to be executed by one or more processors. The instructions include code to cause the one or more processors to receive input data associated with an entity. The code also causes the one or more processors to generate a current state for the entity based on the input data and using a large language model. The code also causes the one or more processors to identify, using a reinforcement learning model, an action from a plurality of actions based on a probability that the action will cause the entity to be associated with an improved state. The code also causes the one or more processors to generate, using a generative machine learning model, output data based on (1) the current state, (2) the improved state, and (3) the action. The output data is configured to effectuate the action.

In some implementations, the reinforcement learning model can be implemented in part using a Markov decision process. In some implementations, the code can further include code to cause the one or more processors to generate a signal configured to cause transmission of the output data to an entity associated with the entity. In some implementations, the input data can include an indication of a geographic location. In some implementations, the code can further include code to cause the one or more processors to prevent an action based further on an indication received from an entity associated with the entity. In some implementations, the action can be identified based further on a constraint associated with at least one of a history of actions or a cost associated with the action. In some implementations, the current state can be associated with an indication of a first level of engagement and the improved state can be associated with an indication of a second level of engagement.

In an embodiment, a non-transitory processor-readable medium stores code representing instructions to be executed by one or more processors. The instructions include code to cause the one or more processors to generate, using a transformer model, a representation of a current state associated with at least one of an individual or a group. The code also causes the one or more processors to identify, using a reinforcement learning model and based on a reward, an action associated with a transition from the current state to a predicted state. The code also causes the one or more processors to generate, using a machine learning model and based on the action, data that is associated with the action and that is to be transmitted to the at least one of the individual or the group. The code also causes the one or more processors to receive an indication of an outcome that is associated with the action and that results from the data being transmitted to the at least one of the individual or the group. The code also causes the one or more processors to determine, based on the indication of the outcome, whether the at least one of the individual or the group are associated with the predicted state as a result of the data being transmitted to the at least one of the individual or the group.

In some implementations, the machine learning model can be a generative machine learning model and the data can include at least one of text data, audio data, image data, or video data. In some implementations, the reward can be associated with an improved level of engagement. In some implementations, the action can include a communication to the at least one of the individual or the group. In some implementations, the action can be identified based further on the current state being associated with at least one of a failed state or a success state. The action can include a cessation of communication to the at least one of the individual or the group. In some implementations, the action can be identified based further on one or more constraints associated with at least one of a cost of the action or an agitation metric associated with the at least one of the individual or the group.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A method comprising:
providing, via a processor, a plurality of inputs from a plurality of sources as input to a first neural network to define a first state associated with (1) an entity and (2) a first node from a plurality of nodes included in a reinforcement learning model;
receiving, at the processor, (1) an indication of a plurality of prospects and (2) an indication of a plurality of actions;
generating, via the processor, a constraint model that includes:
a first set of vertices based on the indication of the plurality of prospects,
a second set of vertices based on the indication of the plurality of actions,
a source vector and a sink vector,
a first set of edges between the first set of vertices and the second set of vertices, each edge from the first set of edges having an edge weight that defines a reward associated with a prospect from the plurality of prospects and an action from the plurality of actions,
a second set of edges between the source vector and the first set of vertices, and
a third set of edges between the second set of vertices and the sink vector;
identifying, via the processor and based on each edge weight associated with the first set of edges, (1) at least a portion of the first set of edges, (2) at least a portion of the second set of edges, and (3) at least a portion of the third set of edges;
determining, via the processor and in response to the identifying, an action constraint associated with the action from the plurality of actions;
providing, via the processor, the first state and the action constraint as input to the reinforcement learning model to produce, based on the reward, (1) a second state associated with a second node from the plurality of nodes and (2) an indication of the action associated with a transition from the first state to the second state;
generating, via the processor and using a second neural network, an implementation of the action based on the first state, the second state, and the indication of the action;
receiving, at the processor and in response to the implementation of the action being transmitted to the entity, a success metric determined based on an outcome of the implementation of the action;

determining, via the processor, a third state associated with the entity based on the success metric; and
retraining, via the processor, the reinforcement learning model based on the success metric.

2. The method of claim 1, wherein:
the entity is a first entity;
the action includes a communication to be transmitted to the first entity;
the indication of the action is determined based further on a historical success metric associated with a previous communication transmitted to at least one of the first entity or a second entity; and
the reward determines a magnitude of expected entity engagement based on the historical success metric.

3. The method of claim 1, wherein:
the first neural network includes a large language model; and
the reinforcement learning model is implemented in part using a Markov decision process.

4. The method of claim 1, wherein:
the second neural network is a generative neural network; and
the implementation of the action includes at least one of text data, audio data, image data, or video data.

5. The method of claim 1, wherein the entity is a first entity, the plurality of inputs is a first plurality of inputs, the action is a first action, and the method further comprises:
determining, via the processor and based on the first plurality of inputs, a second entity; and
determining, via the processor, a second action to be directed at the second entity based on a second plurality of inputs associated with the second entity.

6. The method of claim 1, wherein:
the constraint model is a bipartite graph; and
the determining the action constraint includes solving a flow problem between the source vector and the sink vector.

7. The method of claim 6, wherein the action constraint is associated with at least one of a frequency of the action, a resource capacity associated with the implementation of the action, or an expense associated with the implementation of the action.

8. A non-transitory processor-readable medium storing code representing instructions to be executed by one or more processors, the instructions comprising code to cause the one or more processors to:
receive input data that indicates a first state for an entity;
add, to a constraint model, (1) a first vertex that indicates the entity, the first vertex being included in a plurality of first vertices associated with a plurality of entities, and (2) a plurality of second vertices that indicates a plurality of actions;
generate a first set of edges between the plurality of first vertices and the plurality of second vertices, the first set of edges having a plurality of edge weights that defines a plurality of rewards associated with the plurality of entities and the plurality of actions;
generate a second set of edges that includes an edge between a source vector and the first vertex;
generate a third set of edges between the plurality of second vertices and a sink vector;
identify, based on each edge weight of the first set of edges, (1) at least a portion of the first set of edges, (2) at least a portion of the second set of edges, and (3) at least a portion of the third set of edges;
determine an action constraint associated with the entity and an action from the plurality of actions, in response to identifying (1) at least the portion of the first set of edges, (2) at least the portion of the second set of edges, and (3) at least the portion of the third set of edges;

provide an indication of the first state and the action constraint as input to a reinforcement learning model that is configured to select the action from the plurality of actions based on (1) a reward from the plurality of rewards and (2) a probability that the action will cause the entity to be associated with a second state;

receive an indication of the action as an output of the reinforcement learning model; and generate output data by providing the action as input to a generative machine learning model, the output data configured to effectuate the action.

9. The non-transitory processor-readable medium of claim 8, wherein the reinforcement learning model is implemented in part using a Markov decision process.

10. The non-transitory processor-readable medium of claim 8, wherein the code further comprises code to cause the one or more processors to generate a signal configured to cause transmission of the output data to a compute device associated with the entity.

11. The non-transitory processor-readable medium of claim 8, wherein the input data includes an indication of a geographic location.

12. The non-transitory processor-readable medium of claim 8,
wherein the action is a first action, and the code further comprises code to cause the one or more processors to prevent a second action based further on an indication of feedback received from a compute device associated with the entity.

13. The non-transitory processor-readable medium of claim 8, wherein:
the constraint model includes a bipartite graph; and
the instructions to cause the one or more processors to determine the action constraint include instructions to cause the one or more processors to solve a maximum bipartite matching problem.

14. The non-transitory processor-readable medium of claim 8, wherein the first state is associated with an indication of a first level of engagement and the second state is associated with an indication of a second level of engagement.

15. A non-transitory processor-readable medium storing code representing instructions to be executed by one or more processors, the instructions comprising code to cause the one or more processors to:
generate a representation of a current state associated with at least one of an individual or a group by providing input data from a plurality of sources as input to a transformer model;
generate a constraint model that includes (1) a first vertex representing the at least one of the individual or the group and (2) a plurality of second vertices representing a plurality of actions;
generate a first set of edges between the first vertex and the plurality of second vertices, the first set of edges having a plurality of edge weights that defines a plurality of rewards associated with (1) the at least one of the individual or the group and (2) the plurality of actions;

generate a second set of edges that includes an edge between a source vector and the first vertex;
generate a third set of edges between the plurality of second vertices and a sink vector;
identify, based on each edge weight associated with the first set of edges, (1) at least a portion of the first set of edges, (2) at least a portion of the second set of edges, and (3) at least a portion of the third set of edges;
determine an action constraint based on (1) at least the portion of the first set of edges, (2) at least the portion of the second set of edges, and (3) at least the portion of the third set of edges;
provide the representation of the current state and the action constraint as input to a reinforcement learning model;
receive an indication of an action as an output of the reinforcement learning model based on a reward from the plurality of rewards, the action being from the plurality of actions and associated with a transition from the current state to a predicted state;
provide the indication of the action as input to a machine learning model to generate data that is associated with the action and that is to be transmitted to the at least one of the individual or the group;
receive an indication of an outcome that is associated with the action and that results from the data being transmitted to the at least one of the individual or the group; and
determine, based on the indication of the outcome, whether the at least one of the individual or the group are associated with the predicted state as a result of the data being transmitted to the at least one of the individual or the group.

16. The non-transitory processor-readable medium of claim 15, wherein:
the machine learning model is a generative machine learning model; and
the data includes at least one of text data, audio data, image data, or video data.

17. The non-transitory processor-readable medium of claim 15, wherein the reward is associated with an improved level of engagement.

18. The non-transitory processor-readable medium of claim 15, wherein the action includes a communication to the at least one of the individual or the group.

19. The non-transitory processor-readable medium of claim 15, wherein:
the action is identified based further on the current state being associated with at least one of a failed state or a success state; and
the action includes a cessation of communication to the at least one of the individual or the group.

20. The non-transitory processor-readable medium of claim 15, wherein the plurality of sources includes at least one of content management system (CMS) data, sales engagement platform (SEP) data, customer relationship management (CRM) data, account-based marketing (ABM) data, marketing automation platform (MAP) data, or information security data.

* * * * *